T. ELLIOTT.
CAR TRUCK.
APPLICATION FILED JUNE 9, 1919.
1,322,295.
Patented Nov. 18, 1919.
2 SHEETS—SHEET 1.
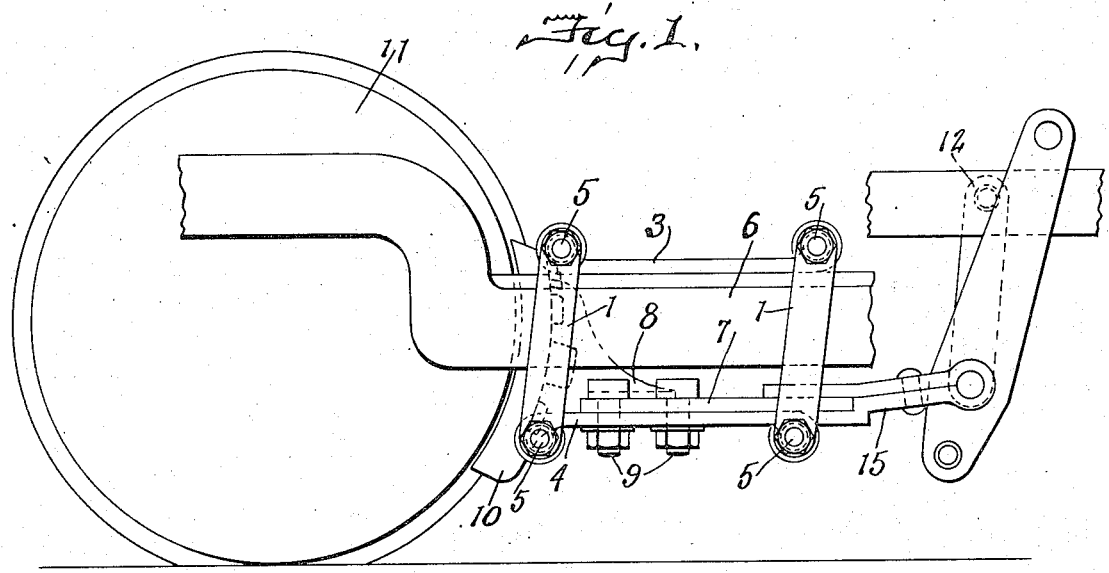
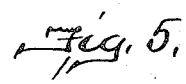
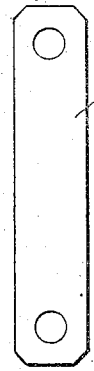
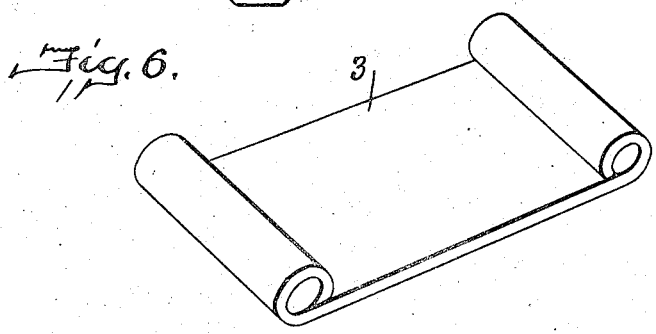
Inventor
Thomas Elliott,
Toulmin &Toulmin,
Attorneys

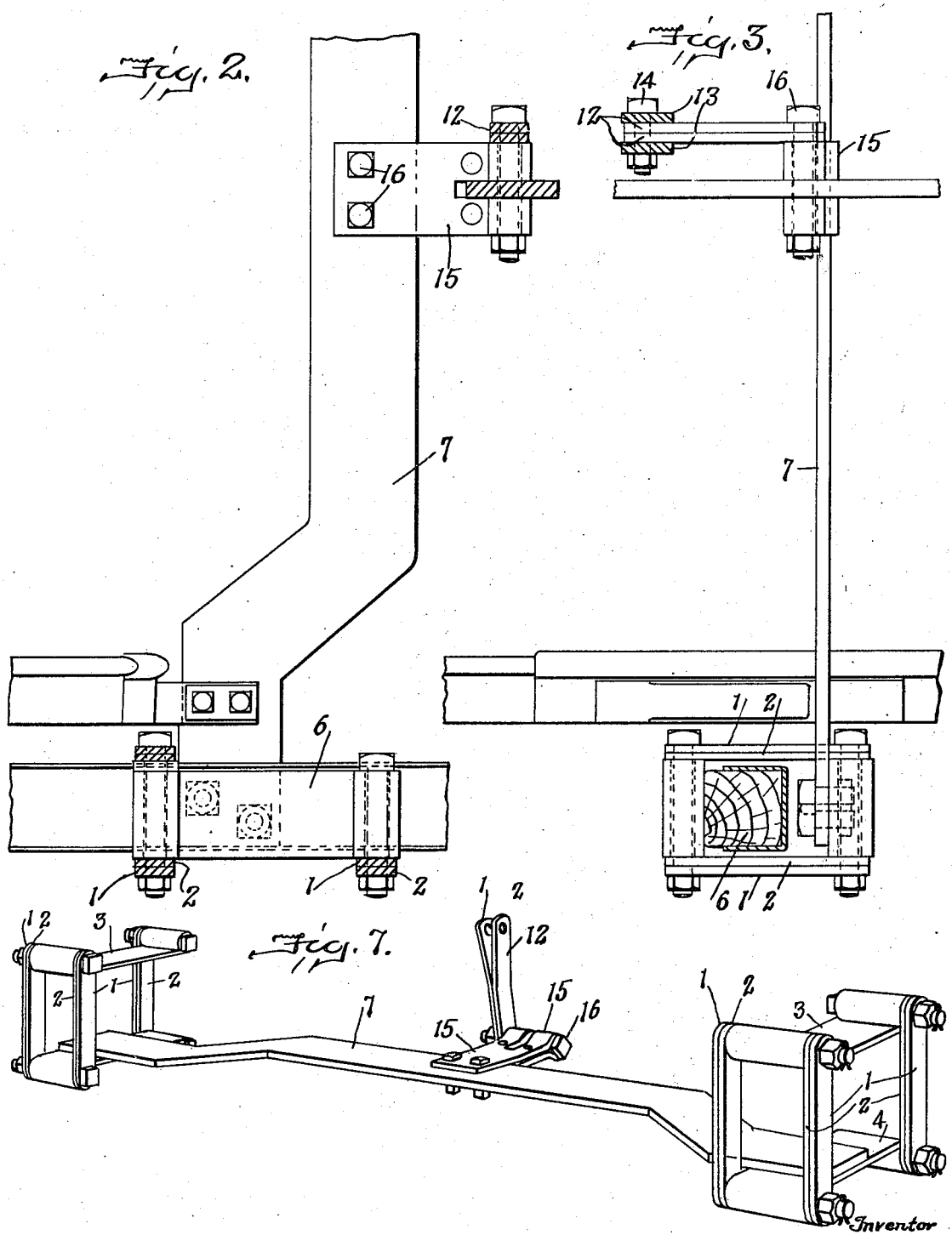

UNITED STATES PATENT OFFICE.

THOMAS ELLIOTT, OF CINCINNATI, OHIO, ASSIGNOR TO THE CINCINNATI CAR COMPANY, OF CINCINNATI, OHIO, A CORPORATION OF OHIO.

CAR-TRUCK.

1,322,295.  Specification of Letters Patent.  Patented Nov. 18, 1919.

Application filed June 9, 1919.  Serial No. 302,717.

*To all whom it may concern:*

Be it known that I, THOMAS ELLIOTT, a citizen of the United States, residing at Cincinnati, in the county of Hamilton and State of Ohio, have invented certain new and useful Improvements in Car-Trucks, of which the following is a specification, reference being had therein to the accompanying drawing.

This invention relates to car trucks and has for its particular object to provide an improved brake hanger which may be applied to trucks of any standard construction, or which may be modified and applied to any type of car truck.

The subject matter of the present invention is a detail of the subject matter contained in a copending application for Letters Patent filed March 13th, 1919, Ser. No. 282,338, in which my improved brake hangers are included in combination with other features of improved truck construction; it being the purpose in the present application to treat the brake hangers *per se* as a separate invention.

As here shown my improved brake hangers consist in parallel suspension plates spaced apart and arranged in pairs and used in sets in a manner whereby the brake beams and brake shoes are suspended and operated in a substantially horizontal plane relative to the truck wheels, and whereby the brake mechanism as a whole is well balanced in its relation to the truck frame.

A further object of the improved construction is to employ brake hangers consisting of pairs of oppositely disposed spring plates, contacting at their central portions and having their opposite ends free to exert spring tension against the sides of the hanger bearings, thus acting to eliminate chatter or noise incident to the operation of the parts under ordinary construction and serving to compensate for the wear of the bearings so that the relation of the hangers to the bearings remains normal irrespective of the wear thereof.

Referring to the accompany drawings;

Figure 1 is a detailed side elevation of a set of my improved brake hangers applied to a car truck of the improved type shown in my copending application referred to;

Figs. 2 and 3 are plan and end views, respectively of the construction shown in Fig. 1;

Figs. 4 and 5 are detailed views of the hangers, Fig. 5 showing the spring feature of the construction;

Fig. 6 is a detail of the brake beam suspension plate; and

Fig. 7 is a detached assembly view in perspective of the complete brake hangers.

As shown in the figures of the drawings, the improved brake hangers consist preferably of the curved spring hanger links 1 and 2 used in pairs, the links contacting at their central portions and curved outwardly, as shown in Fig. 5, so that their opposite ends will be compressed when assembled in the hanger bearings.

The hangers are preferably used in sets of three or four,—as here shown in sets of three, the different pairs of the spring links constituting the set being arranged in parallel relation to each other. The opposite ends of the hangers of each set are linked together by the hanger plates 3 and 4, a detail of which is shown in Fig. 6 of the drawings. The plates 3 and 4 are interchangeable except that the plate 4 is drilled for bolts to secure one end of the brake beam thereto. The ends of the plate are looped, as shown, and bolts 5 pass therethrough and through the ends of the spring links 1 and 2, thus constituting a rectangular-shaped frame surrounding the side frame 6 of the truck frame and having its upper hanger plate 3 secured to the side frame member in any suitable manner, its lower plate 4 swinging free upon the hangers and supporting one end of the brake beam 7 which is secured thereto, together with the brake shoe head 8, with bolts 9; the brake shoes 10 being supported on the brake shoe head relative to the truck wheels 11 in the usual manner.

At the center of the truck, as shown in Figs. 2 and 3 of the drawings, the brake hangers are used preferably in single pairs, as shown at 12, one pair of hangers being used in connection with each brake beam 7. The upper ends of each pair of hangers are pivotally secured in the hanger supporting frame 13, shown in cross section in Fig. 3, by a bolt 14, and the lower swinging end of the link is pivotally connected to the brake beam by means of a fulcrum plate 15 and bolt 16.

From the foregoing detailed description it will be apparent that the present invention provides brake hangers of improved construction and arrangement which may be applied to any type of car truck merely by adapting the shape and size of the hanger parts to the particular type of truck to be furnished with brake equipment; that the improvements consist in providing hangers of simple substantial construction which will stand the hard usage to which car truck equipment is subjected without being subject to excessive wear or rendered out of adjustment; that the brake beams and brake shoes are suspended and caused to move thereby in a plane substantially parallel to the wheel base of the truck, and that the lateral wear of the hanger bearings is automatically compensated for by the opposite expansion of the curved spring links used in pairs, the noise or chatter of the bearings being eliminated by the same arrangement.

The parallel arrangement of the brake hangers, used in pairs and spaced apart in the manner shown serves to suspend the brake beam and brake shoes substantially in a horizontal plane, and thus insures equal contact with the wheels and equal wearing of the brake shoes until the same are worn out. This effective means of preventing uneven contact of the brake shoes not only effects material economies in maintenance but insures more effective operation of the brakes, and is therefore an improvement of first importance in car truck construction.

Having thus fully described my invention, what I claim as new and desire to secure by Letters Patent, is:

1. In brake hangers for car trucks, the combination, a plurality of parallel hanger links arranged in sets and suspended from and on opposite sides of a side member of the truck frame, and a brake beam and brake shoes supported by said hangers and caused thereby to move in a plane substantially parallel to the base line of said truck.

2. In brake hangers for car trucks, the combination, a plurality of parallel hanger links arranged in pairs and in sets and suspended from and on opposite sides of a side member of the truck frame, and a brake beam and brake shoes supported by said hangers and caused thereby to move in a plane substantially parallel to the base line of said truck.

3. In brake hangers for car trucks, the combination, a plurality of parallel hanger links arranged in sets on opposite sides of and suspended from the side members of the truck frame, and a brake beam and brake shoes supported by said hangers and caused thereby to move in a plane substantially parallel to the base line of said truck.

4. In brake hangers for car trucks, the combination, a plurality of parallel hanger links arranged in sets and suspended from the opposite side of the side members and central support of the truck frame, and a brake beam and brake shoes supported by said hangers and caused thereby to move in a plane substantially parallel to the base line of said truck.

5. In brake hangers for car trucks, the combination, a plurality of parallel hanger links arranged in sets and suspended upon the truck frame, plates whereby said links are joined together, and a brake beam having its ends secured to one of said plates of opposite sets, whereby said beam is caused to move in a plane substantially parallel to the base line of said truck.

6. In brake hangers for car trucks, the combination, a plurality of parallel hanger links arranged in sets and suspended upon the side members and central support of the truck frame, plates whereby the links of the outer sets are joined together, a brake beam having its ends secured to said plates and its central portion to the central hanger, whereby said beam is caused to move in a plane substantially parallel to the base line of said truck.

7. In brake hangers for car trucks, the combination, a plurality of parallel hanger links arranged in sets, plates whereby the opposite ends of said links are joined together, one of said plates resting upon the side member of the truck frame, and the other plate swinging free with said hangers, a brake beam having its ends secured to the swinging plates of opposite hangers, whereby said beam is caused to move in a plane substantially parallel to the base line of said truck.

8. In brake hangers for car trucks, the combination, a plurality of parallel hanger links arranged in sets and suspended upon the truck frame, plates whereby said links are joined together, and a brake beam having its ends secured to one of said plates of opposite sets.

9. In brake hangers for car trucks, the combination, a plurality of parallel hanger links arranged in sets, plates whereby the opposite ends of said links are joined together, one of said plates resting upon the side member of the truck frame, and the other plate swinging free with said hangers, and a brake beam having its ends secured to the swinging plates of opposite hangers.

10. In a brake hanger, the combination, of two hanger links contacting at their central portions and having their ends inclined oppositely outwardly and having an alined bearing aperture extending therethrough, and a hanger bolt extending through said apertures, whereby the inclined ends of the opposite links may be compressed toward each other.

11. In a brake hanger, the combination, of a plurality of opposite sets of hangers, each set consisting of two opposite spring links contacting at their central portions and having their ends inclined oppositely outwardly, alined bearing apertures of said opposite sets, and a hanger bolt extending therethrough whereby the inclined ends of the hanger links of each set may be compressed toward each other.

12. In a brake hanger, the combination, of a plurality of opposite sets of hangers arranged substantially parallel to each other, each set consisting of two opposite spring links contacting at their central portions and having their ends inclined oppositely outwardly, alined bearing apertures of said opposite sets, and a hanger bolt whereby the inclined ends of each set of links may be compressed to vary the angle of their inclination.

13. In a brake hanger, the combination, of two oppositely disposed hanger links contacting at their central portions and having their opposite ends inclined oppositely, alined bearing apertures in the ends of said links and a hanger bolt coöperating with each of said apertures, whereby the inclined ends of the opposite links may be compressed to vary the angle of their inclination.

In testimony whereof I affix my signature.

THOMAS ELLIOTT.